(12) United States Patent
Forgang et al.

(10) Patent No.: US 7,896,073 B2
(45) Date of Patent: Mar. 1, 2011

(54) APPARATUS FOR FORMATION RESISTIVITY IMAGING IN WELLS WITH OIL-BASED DRILLING FLUIDS

(75) Inventors: Stanislav W. Forgang, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/425,074

(22) Filed: Apr. 16, 2009

(65) Prior Publication Data

US 2009/0306896 A1   Dec. 10, 2009

Related U.S. Application Data

(63) Continuation-in-part of application No. 12/136,208, filed on Jun. 10, 2008, now abandoned.

(51) Int. Cl.
*E21B 47/00* (2006.01)
*G01V 1/40* (2006.01)

(52) U.S. Cl. .................. 166/250.01; 702/7; 324/373

(58) Field of Classification Search ............. 166/250.01; 324/324, 373–374; 73/152.02, 152.05, 152.18
See application file for complete search history.

(56) References Cited

U.S. PATENT DOCUMENTS

| | | | |
|---|---|---|---|
| 2,930,969 A | 3/1960 | Baker | |
| 3,365,658 A | 1/1968 | Birdwell | |
| 4,122,387 A | 10/1978 | Ajam et al. | |
| 4,468,623 A | 8/1984 | Gianzero et al. | |
| 5,502,686 A | 3/1996 | Dory et al. | |
| 6,600,321 B2 | 7/2003 | Evans | |
| 6,714,014 B2 | 3/2004 | Evans et al. | |
| 6,801,039 B2 * | 10/2004 | Fabris et al. | 324/324 |
| 6,809,521 B2 | 10/2004 | Tabarovsky et al. | |
| 7,397,250 B2 * | 7/2008 | Bespalov et al. | 324/357 |
| 2002/0153897 A1 * | 10/2002 | Evans et al. | 324/374 |
| 2008/0303525 A1 | 12/2008 | Itskovich et al. | |

FOREIGN PATENT DOCUMENTS

CA           685727        5/1960

* cited by examiner

*Primary Examiner* — Jennifer H Gay
*Assistant Examiner* — Yong-Suk Ro
(74) *Attorney, Agent, or Firm* — Mossman Kumar & Tyler PC

(57) ABSTRACT

Sequential measurements are made using a two terminal resistivity imaging device wherein the measure electrodes are activated sequentially with the remaining electrodes in a floating mode. This eliminates the hardware requirements for focusing electrodes, prevents galvanic leakage between proximal electrodes and the effects of mutual coupling between circuits including proximal electrodes.

17 Claims, 6 Drawing Sheets

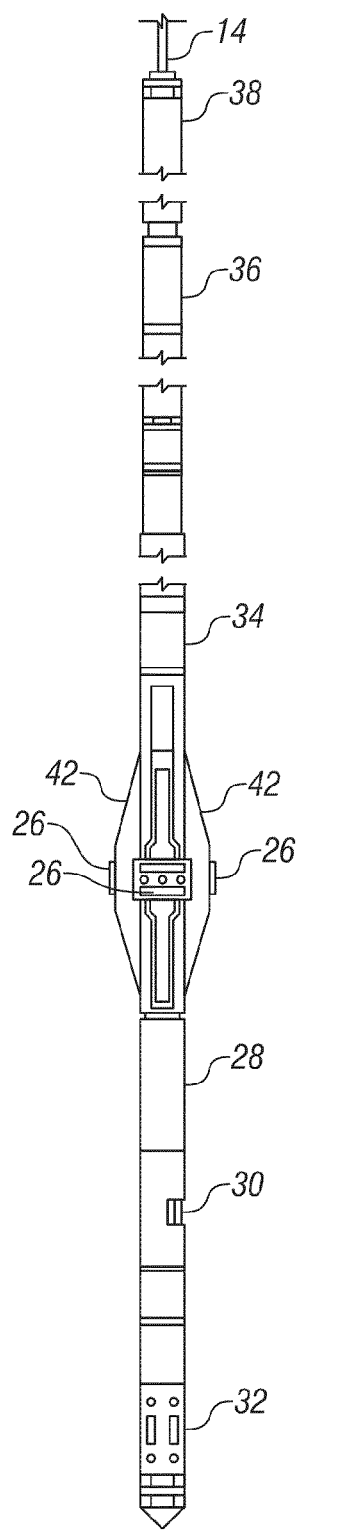
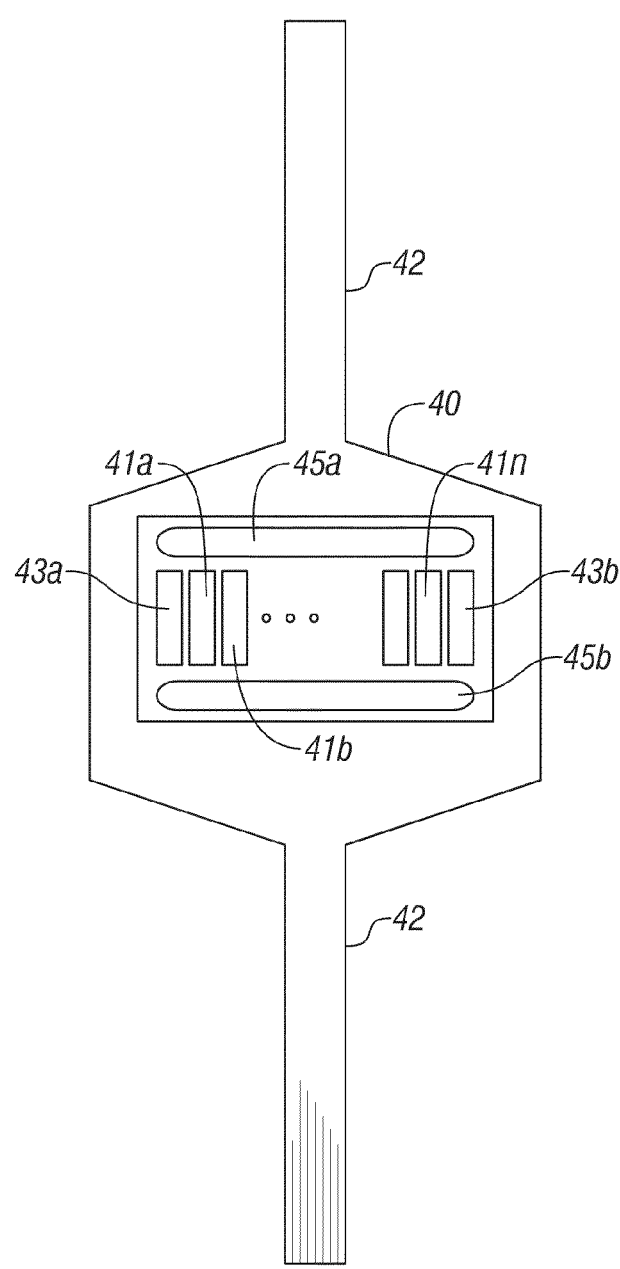
FIG. 2A
(Prior Art)
FIG. 2B
(Prior Art)

APPARATUS FOR FORMATION RESISTIVITY IMAGING IN WELLS WITH OIL-BASED DRILLING FLUIDS

CROSS-REFERENCES TO RELATED APPLICATIONS

This application is a continuation-in-part of U.S. patent application Ser. No. 12/136,208, the contents of which are fully incorporated herein by reference.

BACKGROUND OF THE DISCLOSURE

1. Field of the Disclosure

This disclosure generally relates to exploration for hydrocarbons involving electrical investigations of a borehole penetrating an earth formation. More specifically, this disclosure relates to highly localized borehole investigations of multifrequency focusing of survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present disclosure belongs to the first category.

There are several modes of operation. In one, the current at the measuring electrode is maintained constant and a voltage is measured, while in the second mode, the voltage of the electrode is fixed and the current flowing from the electrode is measured. Ideally, it is desirable that if the current is varied to maintain at a constant value the voltage between measure and return electrodes, the current is inversely proportional to the resistivity of the earth formation being investigated. Conversely, it is desirable that if this current is maintained constant, the voltage measured between monitor electrodes is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems.

Techniques for investigating the earth formation with arrays of measuring electrodes have been proposed. An exemplary patent uses an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described. Another patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole.

U.S. Pat. No. 6,714,014 to Evans et al, having the same assignee as the present disclosure and the contents of which are incorporated herein by reference, teaches the use of capacitive coupling with the formation through both oil-based mud and water-based mud.

The Dory patent (U.S. Pat. No. 5,502,686) discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes are irregular, resulting in inaccurate imaging of the borehole. A second drawback is the relatively shallow depth of investigation caused by the use of measure electrodes at the same potential as the pad and the resulting divergence of the measure currents. U.S. Pat. No. 6,809,521 to Tabarovsky et al. discloses a multi-frequency method for determination of formation resistivity. The assumption made in Tabarovsky is that $$\frac{\sigma_1}{\varepsilon_1} \ll \omega \ll \frac{\sigma_2}{\varepsilon_2}$$

where the $\sigma$'s are conductivities, the $\varepsilon$'s are dielectric constant, $\omega$ is the operating frequency, the subscript 1 refers to the mud and the subscript 2 refers to the formation. The first of the two inequalities is easily satisfied with oil based mud where the mud conductivity is extremely small. However, if the mud has a finite conductivity, the condition is hard to satisfy. It would be desirable to have an apparatus and method of determination of formation resistivity that is relatively insensitive to borehole rugosity and can be used with either water based or with oil-based muds for a wide range of formation resistivities. The present disclosure satisfies this need.

U.S. Pat. No. 7,397,250 to of Bespalov et al., having the same assignee as the present disclosure and the contents of which are incorporated herein by reference, discloses a dual frequency apparatus and method for borehole resistivity imaging. There are a number of technically challenging issues that still remain. One of these is the elimination of "galvanic" cross-talk between sensor electrodes through non-conductive mud and a conductive formation. This error becomes more pronounced in the presence of borehole rugosity when the sensor experience uneven standoff from the formation. Another problem with multi-electrode imaging tools is the presence of mutual inductive coupling between circuits defined by the individual button electrodes. Most importantly, while prior art methods recognize the need for methods and hardware for maintaining the buttons at equipotential using, for example, focusing electrodes, this still remains a difficult technical problem at elevated frequencies (in the MHz range). In addition, multifrequency methods require that each of the amplifiers be maintained at proper tuning at a plurality of frequencies.

SUMMARY OF THE DISCLOSURE

One embodiment of the disclosure is a method of imaging a resistivity property of a subsurface material. The method includes conveying a logging tool into a borehole, the logging tool having a plurality of unfocused measure electrodes; reducing a leakage of current from at least one of the plurality of measure electrodes to the subsurface material adjacent to another of the plurality of measure electrodes; conveying a first measure current having a first frequency through a first one of the plurality of measure electrodes conveying a second measure current at the first frequency through a second one of the plurality of measure electrodes; and producing a 2-D image of the resistivity property of the subsurface material using a value of the first measure current and a value of the second measure current.

Another embodiment of the disclosure is an apparatus for imaging a resistivity property of a subsurface material. The apparatus includes: a logging tool having a plurality of unfocused measure electrodes configured to be into a borehole, the logging tool including circuitry configured to reduce leakage of current from at least one of the plurality of measure electrodes to the subsurface material adjacent to a second one of the plurality of measure electrodes; and at least one processor configured to convey a first measure current having a first frequency through a the at least one of the at least one pair of measure electrodes; convey a second measure current at the first frequency through the second one of measure electrodes; and produce an image of the borehole wall of the resistivity property of the subsurface material using a value of the first measure current and a value of the second measure current.

Another embodiment of the disclosure is a computer-readable medium accessible to at least one processor. The computer-readable medium includes instructions which enable the at least one processor to convey a first measure current at a first frequency through a first unfocused electrode on a logging tool in a borehole; convey a second measure current at the first frequency through a second unfocused electrode on the logging tool; and produce an image of the borehole wall of the resistivity property of the subsurface material using a value of the first measure current and a value of the second measure current, wherein the logging tool includes circuitry configured to reduce leakage of current from the first electrode to a location on the borehole wall adjacent to the second electrode.

BRIEF DESCRIPTION OF THE FIGURES

The present disclosure is best understood with reference to the accompanying figures in which like numerals refer to like elements and in which:

FIG. 2A (prior art) is a mechanical schematic view of an exemplary imaging tool;

FIG. 2B (prior art) is a detail view of an electrode pad of an exemplary logging tool;

DETAILED DESCRIPTION OF THE DISCLOSURE

Figure 1:
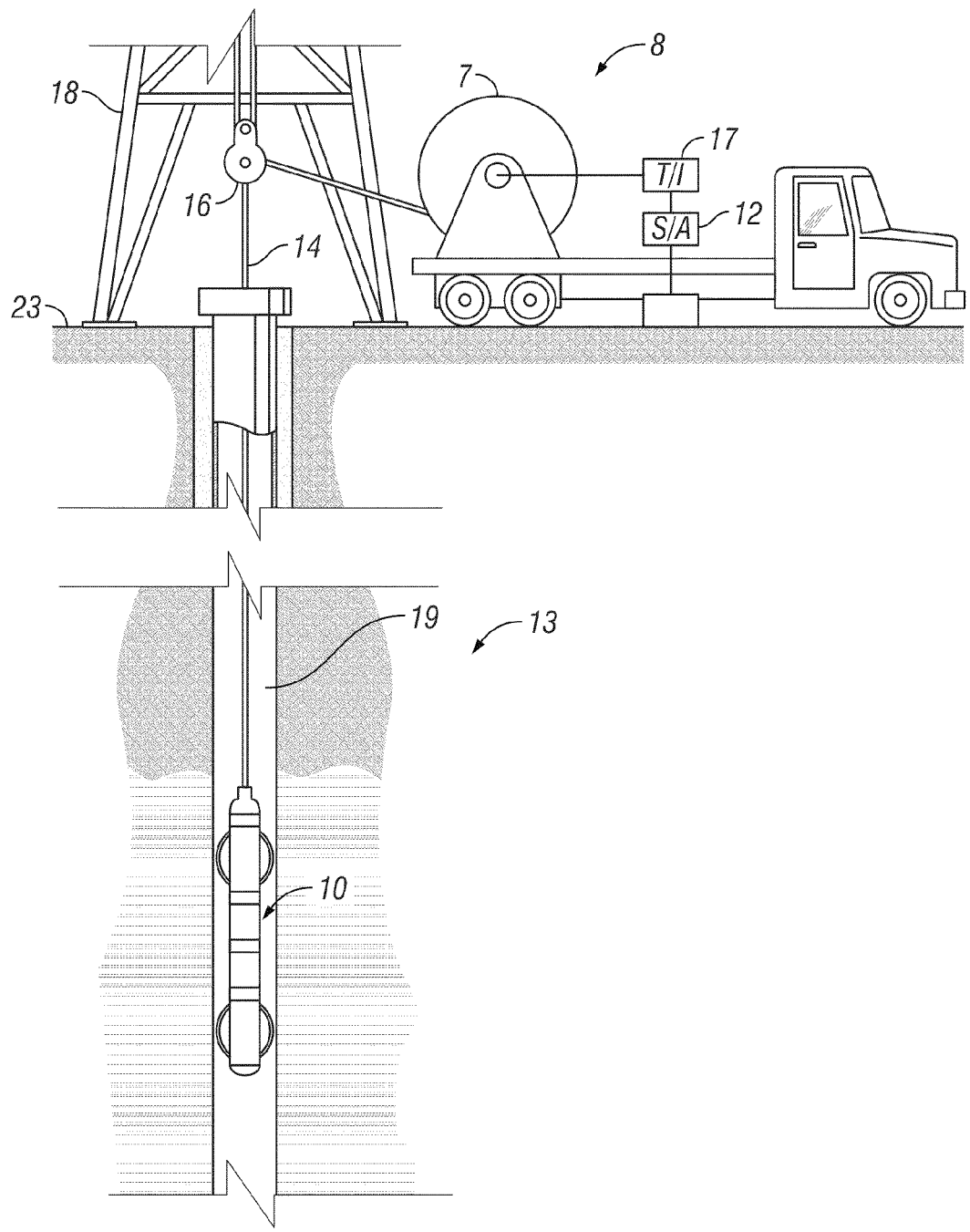
FIG. 1 (prior art) shows an exemplary logging tool suspended in a borehole.

FIG. 1 shows an exemplary imaging tool 10 suspended in a borehole 19, that penetrates earth formations such as 13, from a suitable cable 14 that passes from drum 7 over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works. The truck 8 includes electronics module 17, on the surface 23, that transmits the required operating commands downhole and in return, receives data back which may be recorded on an archival storage medium of any desired type for concurrent or later processing. The data may be transmitted in analog or digital form. Data processors such as a suitable computer 12, may be provided for performing data analysis in the field in real time or the recorded data may be sent to a processing center or both for post processing of the data.

FIG. 2A is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 may contain a telemetry module for sampling, digitizing and transmission of the data samples from the various components uphole to surface electronics 12 in a conventional manner. If acoustic data are acquired, they are preferably digitized, although in an alternate arrangement, the data may be retained in analog form for transmission to the surface where it is later digitized by surface electronics 12.

Also shown in FIG. 2A are three resistivity arrays 26 (a fourth array is hidden in this view. Referring to FIGS. 2A and 2B, each array includes measure electrodes 41a, 41b, . . . 41n on pad 40 for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 3:
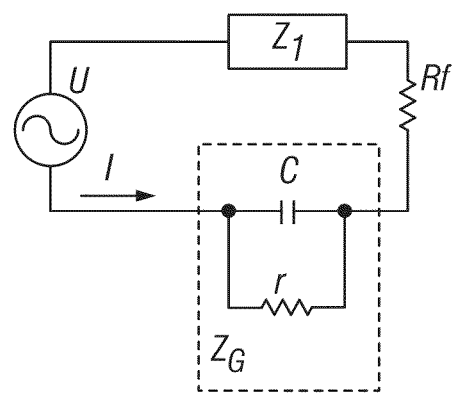
FIG. 3 is a schematic circuit diagram corresponding to an ideal two-electrode imaging system.

The approximate imaging schematic circuit diagram for an ideal two-electrode case (single sensor electrode and return electrode) is presented in FIG. 3. It shows that the measured effective impedance $Z_e$ depends on the internal impedance of the tool $Z_T$, the impedance due to the gap between sensor electrode and formation $Z_G$ and effective formation resistance $R_f$. With the measurement condition for operating frequency set per Tabarovsky the effective formation resistance $R_f$ is proportional to formation resistivity (or in converse with formation conductivity). The impedance appearing between the return electrode and the formation could be ignored as being very small compared to others. This is a reasonable assumption due to the large area of the return electrode. If U is the applied voltage and I is the measured current then the complex impedance $Z_e$ is $$Z_e = Z_T + Z_G + R_f = \frac{U}{I}. \quad (1)$$

In case of a conductive formation (with a resistivity less than 10 Ω-m) and oil-based mud, the contribution of the formation into the effective impedance becomes small $R_f <<< Z_T + Z_G$ which results in a reduction of the sensitivity of the measured impedance to the resistivity of formation. The gap impedance $Z_G$, which depends on the mud properties and the receiver standoff, becomes a major contributor to the effective impedance. Typically, $Z_T$ is negligible and could be excluded from considerations for on-pad oil-based imagers.

Notice that there the current flow through a button follows a path that typically includes transmitter (return) electrode-formation-mud-button-electronics and back to transmitter electrode. The path has complex impedance which is dominated by the gap capacitive reactance in oil-based mud. Some inductive reactance might also be present due to path length. However, the locality of measurements in the current disclosure makes it negligible. See, for example, U.S. Pat. No. 6,714,014 to Evans et al.

Figure 4:
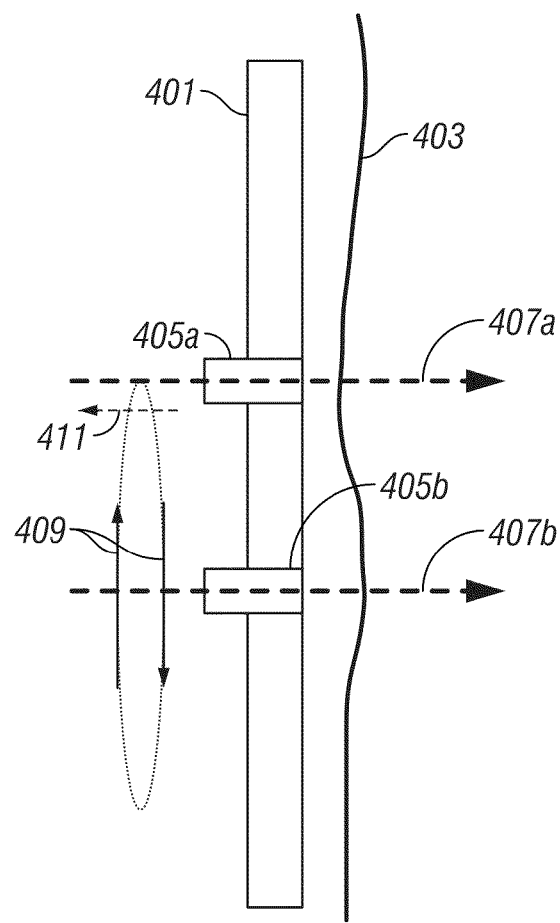
FIG. 4 shows the mutual coupling between current flows in two electrodes.

An effect that can not be ignored is the mutual magnetic coupling between these current paths and particularly in the areas where current paths become separated. This happens when currents leave a conductive formation and then flow through mud to buttons. This is illustrated in FIG. 4 where the pad is depicted by 401, two button electrodes are denoted by 405a, and 405b, and the borehole wall by 403.

The currents in the two electrodes are denoted by 407a, 407b. The current 407b produces a magnetic field denoted by 409 that, in turn, crosses the conduction path of the neighboring electrode 405a, thus inducing a current denoted by 411 in the first electrode 405a. Those versed in the art and having benefit of the present disclosure would recognize that if the currents 407a, 407b in the two electrodes were the same, this mutual coupling would not matter. One reason that the currents are not the same even when the formation resistivity is the same adjacent to the two electrodes 405a, 405b is that borehole rugosity leads to changes in the capacitance C and the resistance r contributing to the gap impedance $Z_g$ in FIG. 3. The effect of this is discussed below.

Figure 5:
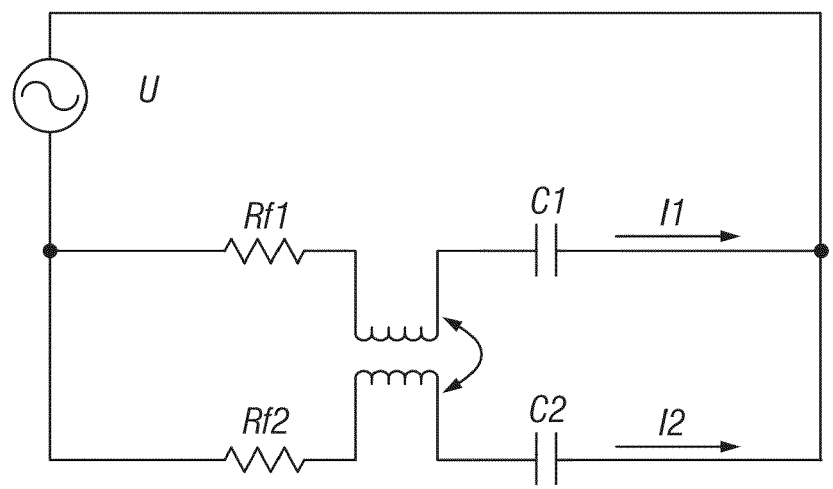
FIG. 5 shows the equivalent circuit for the mutual coupling between current flows in the two electrodes.

The equivalent circuit for this is depicted in FIG. 5. The currents in the two flow paths are depicted by I1 and I2 respectively and M is the mutual inductance. According to Faraday's Law the induced EMF would be proportional to the operating frequency and generates a compensation current in the neighboring conduction path. Upon a detailed analysis, it is found that in general case of oil-based mud imaging, the phase of these parasitic current would be almost 90° behind the phase of measured current.

Figure 6:
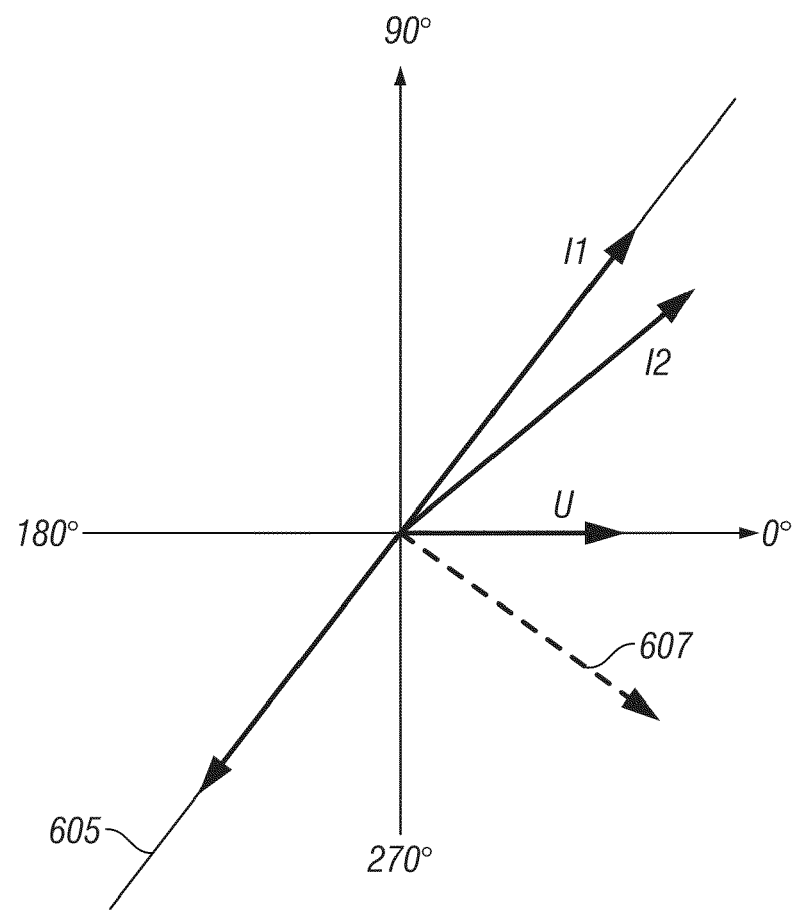
FIG. 6 shows a phasor diagram of the currents in two electrodes, the induced EMF and the parasitic current.

Referring to FIG. 6, the phasor diagram of the currents and voltages is shown. The currents in the two electrodes are denoted by I1 and I2. The phase difference between the two may be due to differences in capacitances arising from standoff differences of the two electrodes from the borehole wall. The induced EMF is denoted by 605. The parasitic current induced is indicated by 607.

Generalizing the discussion to a plurality of electrodes, we conclude that:
  there is a particular preferable conduction path associated with a particular sensor M from the total set of N buttons;
  every sensor current becomes a vector sum of the measure current $I_M$ and at least N−1 parasitic currents due to magnetic coupling with neighboring paths associated with sensors number 1, 2, . . . M−1, M+1, . . . N);
  the vector sum of parasitic currents would have a phase that is different from the phase of measure current. If mud reactance dominates in the overall impedance in front of the pad, the phase of vector sum would be close to 90° behind the phase of current $I_M$; and
  this effect could produce a significant error in post-processing estimation of $Z_G$ and $R_F$, often resulting in obtaining both gap width and formation resistivity well above the actual values.

Another resistivity imaging problem associated with current re-distribution in the formation has been noted before in oil-based imagers. See, for example, U.S. Pat. No. 6,714,014 to Evans et al. Conventionally it has been called as a "defocusing" of the high frequency button current if a neighboring conductive pad structure is presented. See, for example, U.S. patent application Ser. No. 11/758,875 of Itskovich et al., filed on Jun. 6, 2007, having the same assignee as the present disclosure and the contents of which are incorporated herein by reference. As disclosed therein, the button and pad body are kept under the same potential as the sensor.

The simplified physics of this effect could be seen through example is based on an equivalent Wheatstone bridge presentation and includes two neighboring buttons. As one can see from the FIG. 7, even in case of homogeneous formation ($R_{F1}=R_{F2}$) the high impedance mud and uneven button standoff ($Z_{G1}>Z_{G2}$) create a potential distribution, primarily along the borehole wall (across resistor $R_{bw}$). In a first approximation this happens due to apparent differences in both magnitudes and phases of $Z_G$, with a minor effect due to formation impedances. The bridge's legs become unbalanced (U1≠U2) and current appears in the diagonal. Following Ohm's Law, a significant portion of this current which would otherwise be going in the sensor #1 with a bigger standoff will now flow in the sensor #2 where the gap is smaller. As a result the image losses its fidelity, becomes distorted and smeared in details.

Providing for a high level of button equipotentiality has remained a challenge at higher frequencies. The sensor current has to be measured while entering the button and at elevated frequencies (10 MHz and above) mutual coupling of the button with associated electronics and rest of pad structure becomes an issue. Moreover, electronics itself could create unwanted biases coupled to the buttons and thus driving currents between them.

Figure 8:
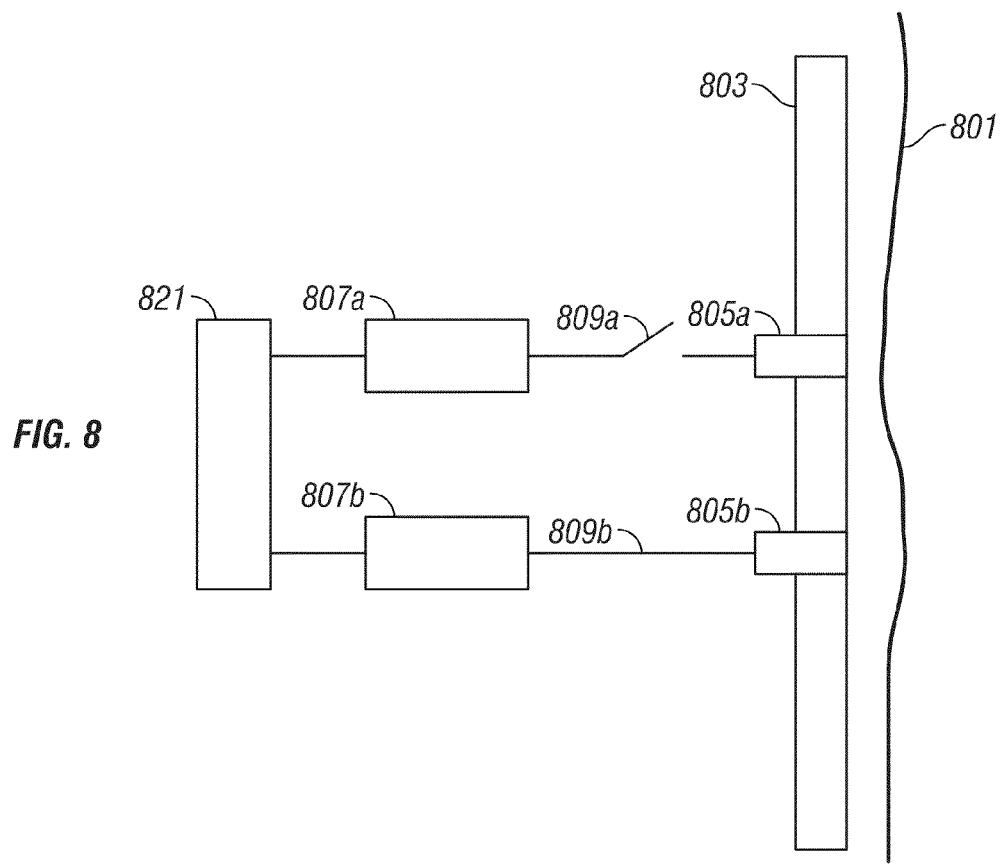
FIG. 8 is schematic diagram of some aspects of the present disclosure.

The principles of the present disclosure are illustrated by FIG. 8. Shown therein is a logging tool with a nonconducting pad 803 and a rugose borehole 801. Two exemplary electrodes 805a, 805b are shown, though in reality, there would usually be many more electrodes. An important difference between the electrode configuration here and in prior art devices is an absence of focusing electrodes and guard electrodes. Instead, each electrode (805a, 805b) is coupled to its corresponding preamplifier (807a, 807b) through a switch (809a, 809b). In the example shown, the switch is depicted as a mechanical device, but any type of switching device could be used, including transistors, integrated circuits, etc. For the purposes of the present disclosure, we use the following definition of a switch: "a device for making, breaking, or changing the connections in an electrical circuit." The preamplifiers 807a, 807b may be connected to a processor 821.

An important aspect of the present disclosure is that only one of the electrodes (805a, 805b) is connected to a power source at a time. This means that if a measure current is flowing through one of the electrodes, 805a for example, there is no current flowing through any of the adjacent electrodes. The data are acquired sequentially by the individual electrodes rather than the prior art methods of simultaneous acquisition. Consequently, there is no need to use focusing or guard electrodes to prevent leakage current between the electrodes.

Figure 7:
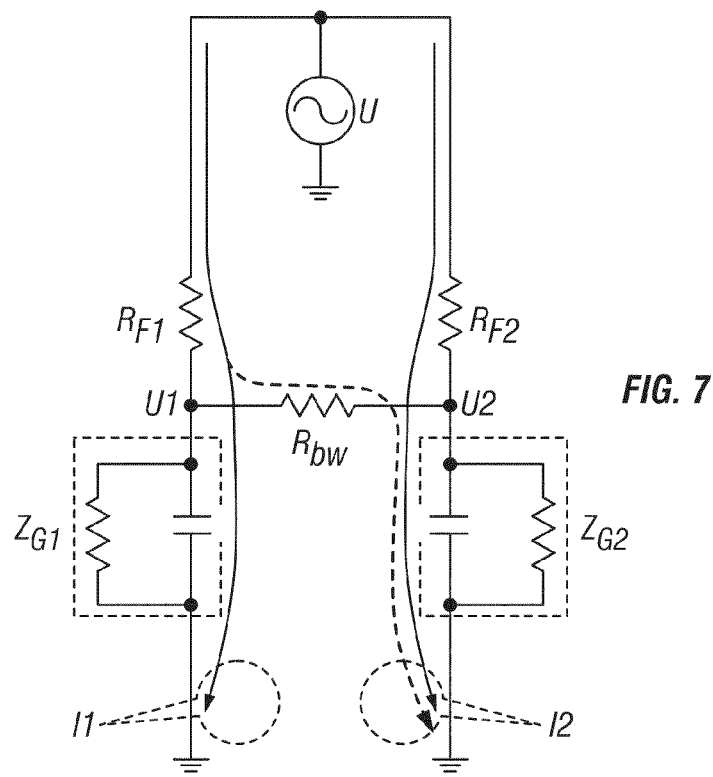
FIG. 7 shows an equivalent Wheatstone bridge configuration of two button electrodes in combination with equivalent formation and mud electrical parameters to demonstrate the current imbalance due to uneven standoff.

In terms of the Wheatstone bridge representation of FIG. 7, it can be shown that the apparent impedance seen by the electrode 405a, 405b, given by the ratio of the voltage U to the current in the electrode is:

$$\hat{Z}_1 = Z_{g1} + R_{f1}\left\{1 + \frac{1}{R_{bw}}\left[Z_{g1} - Z_{g2}\frac{1+Z_{g1}\left(1+\frac{R_{f1}+R_{f2}}{R_{bw}}\right)}{1+Z_{g2}\left(1+\frac{R_{f1}+R_{f2}}{R_{bw}}\right)}\right]\right\}, \text{ and} \quad (2)$$

$$\hat{Z}_2 = Z_{g2} + R_{f2}\left\{1 + \frac{1}{R_{bw}}\left[Z_{g2} - Z_{g1}\frac{1+Z_{g2}\left(1+\frac{R_{f1}+R_{f2}}{R_{bw}}\right)}{1+Z_{g1}\left(1+\frac{R_{f1}+R_{f2}}{R_{bw}}\right)}\right]\right\}. \quad (3)$$

The following points may be made about the apparent impedances $\hat{Z}_1$ and $\hat{Z}_2$. For any finite value of $R_{bw}$, the impedance at a selected electrode depends not only upon the gap impedance at the selected electrode and the formation resistivity at the selected electrode but also upon the gap impedance and the formation resistivity of the adjacent electrode. This is responsible for the smearing effect in resistivity imaging, a problem that has been addressed in prior art by use of focusing electrodes (which makes $R_{bw}$ very large).

For the example shown in FIG. 8, wherein by open circuiting one of the electrodes, the associated impedance is made infinite, the impedance seen by the other electrode is given by $$\hat{Z}_1 = Z_{g1} + \frac{R_{f2}(R_{f1}+R_{bw})}{R_{f1}+R_{f2}+R_{bw}} \quad (4)$$

with a similar expression for the other electrode. Note that in this case, the impedance seen be an electrode depends upon its local gap impedance and the impedance of the formation adjacent the electrodes and does not depend on the gap impedance of the adjacent electrodes. Furthermore, the difference of the impedances seen by the electrodes will be $$\hat{Z}_1 - \hat{Z}_2 = (Z_{g1} - Z_{g2}) + \frac{R_{bw}(R_{f1}-R_{f2})}{R_{bw}+R_{f1}+R_{f2}}. \quad (5)$$

This means that the difference in the impedance seen be the two electrodes is approximately a linear function of the differences in the formation resistivities adjacent the two electrodes. Thus, where the tool is centered in a smooth borehole, the image produced will be a reasonably accurate representation of changes in formation resistivity. The method of sequentially disconnecting one of the electrodes can be seen to eliminate the effects of leakage current into an electrode from the formation near adjacent electrodes.

There are a number of ways by which the sequential acquisition can be carried out. This could be done by sequentially connecting and disconnecting the switches 809a, 809b 809b under control of the processor 821, or by disabling input circuits of preamplifiers 807a, 807b under the control of the processor 821.

Besides simplifying the hardware, the method disclosed above also eliminates the galvanic cross-talk between the channels. Based on the discussion above, when there is no current flowing through the other electrodes, the effect of mutual coupling is eliminated. This is equivalent to eliminating leakage current into an electrode from the formation adjacent to other electrodes.

Figure 9:
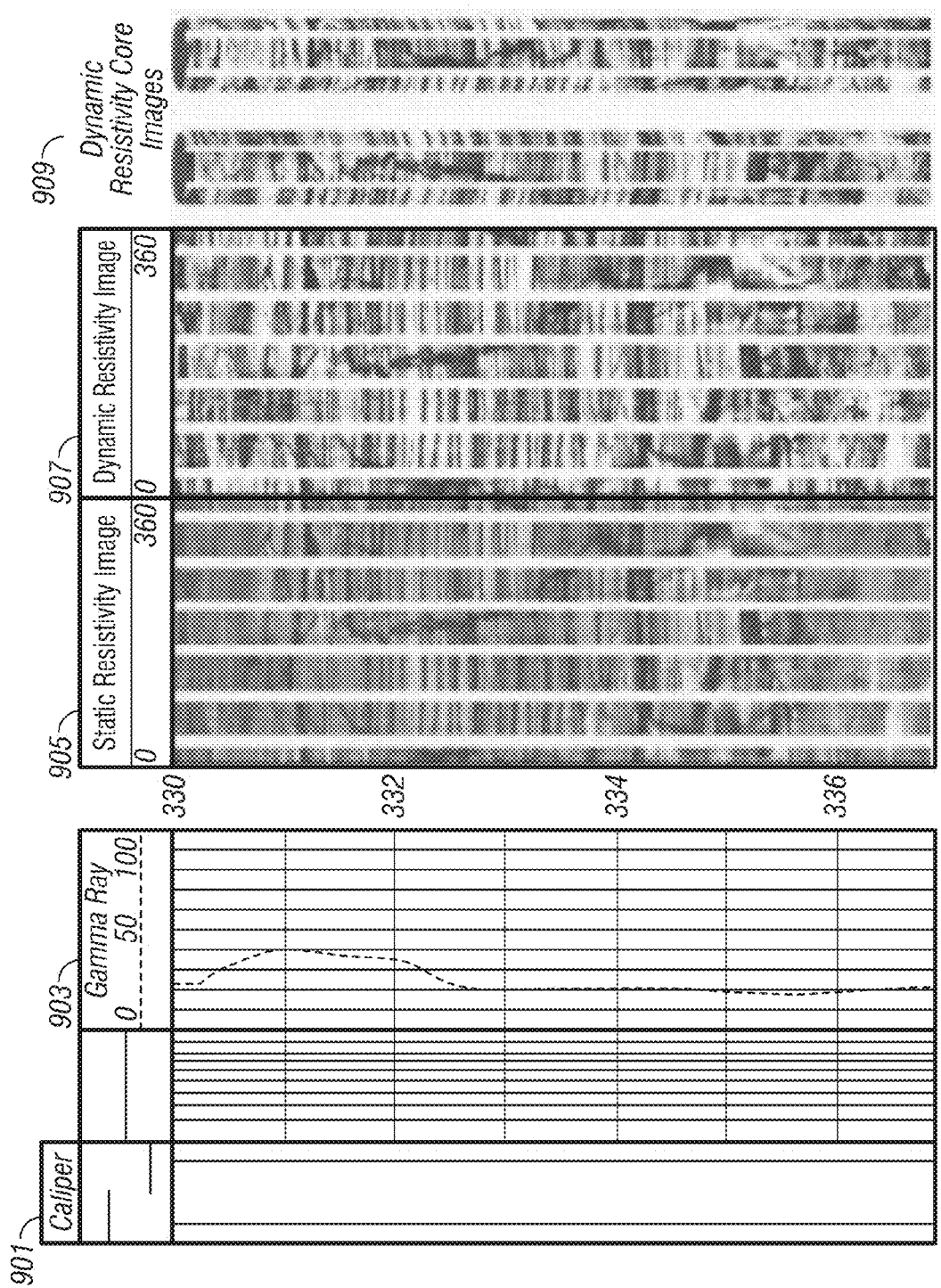
FIG. 9 is an exemplary image display of the Baker Hughes Earth Imager®.

Referring now to FIG. 9, an exemplary image obtained using the Earth Imager® is shown. This is an example of what should be obtainable using the method of the disclosure above. 901 shows the caliper log. 903 shows the gamma ray log. 905 shows a 2-D image of the borehole wall with a fixed gain display. 907 shows a 2-D image of the borehole wall with a dynamic gain applied to the display. 909 shows two isometric views of the borehole wall in cylindrical geometry.

The disclosure above was directed towards a method and apparatus for eliminating the effects of mutual magnetic coupling between currents flowing through different electrodes and eliminating leakage currents into electrodes. In an alternate embodiment of the disclosure, instead of completely eliminating the mutual magnetic coupling or the leakage current, the leakage current is mitigated by introducing series impedance at each and every sense electrode. This acts to suppress the differences between the signals at each electrode, thereby reducing the relative magnitude of the leakage current. The series impedance can be achieved using a resistor, capacitor or inductor, or by adding an inductor, or by adding an 'impeding material' in the current path, such as an insulator in front of the electrodes. While it is obviously not desirable to have a soft material in contact with the borehole wall, such a configuration might be acceptable for imaging a fluid. Mitigation can also be achieved by attempting to calibrate the response in an environment that is substantially similar to the measurement environment, although this is generally much less practical. From a practical standpoint, introducing a series impedance enables a higher logging speed than sequentially disconnecting individual electrodes. In terms of the Wheatstone bridge representation, increasing the series impedance tends to make the analysis more like that of the case where one of the electrodes is disconnected.

Reduction of leakage current can also be accomplished by increasing the spacing between the electrodes. Increasing the electrode separation increases $R_{bw}$ and tends to give the same result as disconnecting one of the electrodes, i.e., the impedance seen by the electrodes tends towards the sum of the local gap impedance and the local formation resistivity. Specifically, when $R_{bw} \rightarrow \infty$, $\hat{Z}_1 \rightarrow Z_{g1}+R_{f1}$ from eqn. (2). Thus, the methods discussed above may be viewed as correcting for the effects of leakage currents flowing to the measure electrodes without the use of focusing electrodes when there are variations of the gap impedance. This method is simpler than the use of focusing electrodes and guard electrodes that have to be maintained at specific potentials in order to be effective.

A point to note with the present disclosure is that many of the prior art processing methods may also be applied to data acquired using the method of the present disclosure. This includes, for example, dual frequency focusing (U.S. patent application Ser. No. 11/209,531 of Bespalov et al.).

The disclosure has further been described by reference to logging tools that are intended to be conveyed on a wireline. However, the method of the present disclosure may also be used with measurement-while-drilling (MWD) tools, or logging while drilling (LWD) tools, either of which may be conveyed on a drillstring or on coiled tubing. An example of a resistivity imaging tool for MWD use is discloses in U.S. Pat. No. 6,600,321 to Evans, having the same assignee as the present disclosure and the contents of which are incorporated herein by reference.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of imaging a resistivity property of a subsurface material, the method comprising:
    conveying a logging tool into a borehole, the logging tool having a plurality of unfocused measure electrodes;
    reducing a leakage of current from at least one of the plurality of measure electrodes to the subsurface material adjacent to another one of the plurality of measure electrodes by introducing a series impedance with the at least one of the plurality of measure electrodes and the other one of the plurality of measure electrodes;
    conveying a first measure current having a first frequency through a first the at least one of the plurality of measure electrodes;
    conveying a second measure current at the first frequency through a second the other one of the plurality of measure electrodes; and
    producing a 2-D image of the resistivity property of the subsurface material using a value of the first measure current and a value of the second measure current.

2. The method of claim 1 further comprising selecting the series impedance from the group consisting of: (i) a resistance, (ii) a capacitance, and (iii) an inductance.

3. The method of claim 1 further comprising using a return electrode to return the first measure current and the second measure current.

4. The method of claim 1 further comprising using a substantially non-conducting fluid in the borehole.

5. The method of claim 1 further comprising conveying the logging tool on one of: (i) a bottomhole assembly on a drilling tubular, and (ii) a downhole logging string conveyed on a wireline.

6. The method of claim 1 further comprising conveying the measure currents at a second frequency.

7. An apparatus for imaging a resistivity property of a subsurface material the apparatus comprising:
    a logging tool having a plurality of unfocused measure electrodes configured to be into a borehole, the logging tool including circuitry configured to reduce leakage of current from at least one of the plurality of measure electrodes to the subsurface material adjacent to a another one of the plurality of measure electrodes by including a series impedance with the at least one of the plurality of measure electrodes and the other one of the plurality of measure electrodes; and
    at least one processor configured to:
        (A) convey a first measure current having a first frequency through the at least one of the at plurality of measure electrodes;
        (B) convey a second measure current at the first frequency through the other one of measure electrodes; and
        (C) produce an image of the borehole wall of the resistivity property of the subsurface material using a value of the first measure current and a value of the second measure current.

8. The apparatus of claim 7 wherein the series impedance further comprises at least of: (i) a resistance, (ii) a capacitance, and (iii) an inductance.

9. The apparatus of claim 7 further comprising a return electrode configured to return the first measure current and the second measure current.

10. The apparatus of claim 7 further comprising a conveyance device configured to convey the logging tool into the borehole, the conveyance device selected from: (i) a drilling tubular configured to convey a bottomhole assembly, and (ii) a wireline configured to convey a logging string.

11. The apparatus of claim 7 wherein the processor is further configured to convey the first measure current at a second frequency.

12. A method of imaging a resistivity property of a subsurface material, the method comprising:
    conveying a logging tool into a borehole, the logging tool having a plurality of unfocused measure electrodes;
    reducing a leakage of current from at least one of the plurality of measure electrodes to the subsurface material adjacent to another one of the plurality of measure electrodes;
    conveying a first measure current having a first frequency through a first one of the plurality of measure electrodes;
    conveying a second measure current at the first frequency through a second one of the plurality of measure electrodes; and
    producing a 2-D image of the resistivity property of the subsurface material using a value of the first measure current and a value of the second measure current;
    wherein reducing the leakage current further comprises:
        (i) floating the other one of the plurality of measure electrodes while conveying the first measure current through the at least one of the plurality of measure electrodes, and
        (ii) floating the at least one of the plurality of measure electrodes while conveying the second measure current through the other one of the plurality of measure electrodes.

13. The method of claim 12 wherein floating any of the plurality of electrodes further comprises at least one of: (i) disconnecting an electrical connection, and (ii) disabling an input to an amplifier.

14. The method of claim 13 further comprising using a substantially non-conducting fluid in the borehole.

15. An apparatus for imaging a resistivity property of a subsurface material the apparatus comprising:
    a logging tool having a plurality of unfocused measure electrodes configured to be into a borehole, the logging tool including circuitry configured to reduce leakage of current from at least one of the plurality of measure electrodes to the subsurface material adjacent to a another one of the plurality of measure electrodes; and
    at least one processor configured to:
    (A) convey a first measure current having a first frequency through a the at least one of the plurality of measure electrodes while floating the other one of the plurality of measure electrodes;
    (B) convey a second measure current at the first frequency through the other one of measure electrodes while floating the at least one of the plurality of measure electrodes; and
    (C) produce an image of the borehole wall of the resistivity property of the subsurface material using a value of the first measure current and a value of the second measure current.

16. The apparatus of claim 15 wherein the processor is further configured to float any of the plurality of electrodes by at least one of: (i) disconnecting an electrical connection, and (ii) disabling an input to an amplifier.

17. The apparatus of claim 16 further comprising a conveyance device configured to convey the logging tool into the borehole, the conveyance device selected from: (i) a drilling tubular configured to convey a bottomhole assembly, and (ii) a wireline configured to convey a logging string.

* * * * *